Feb. 14, 1933.  G. W. SNARR  1,897,737
BEARING EXTRACTING AND INSTALLING DEVICE
Filed May 25, 1932
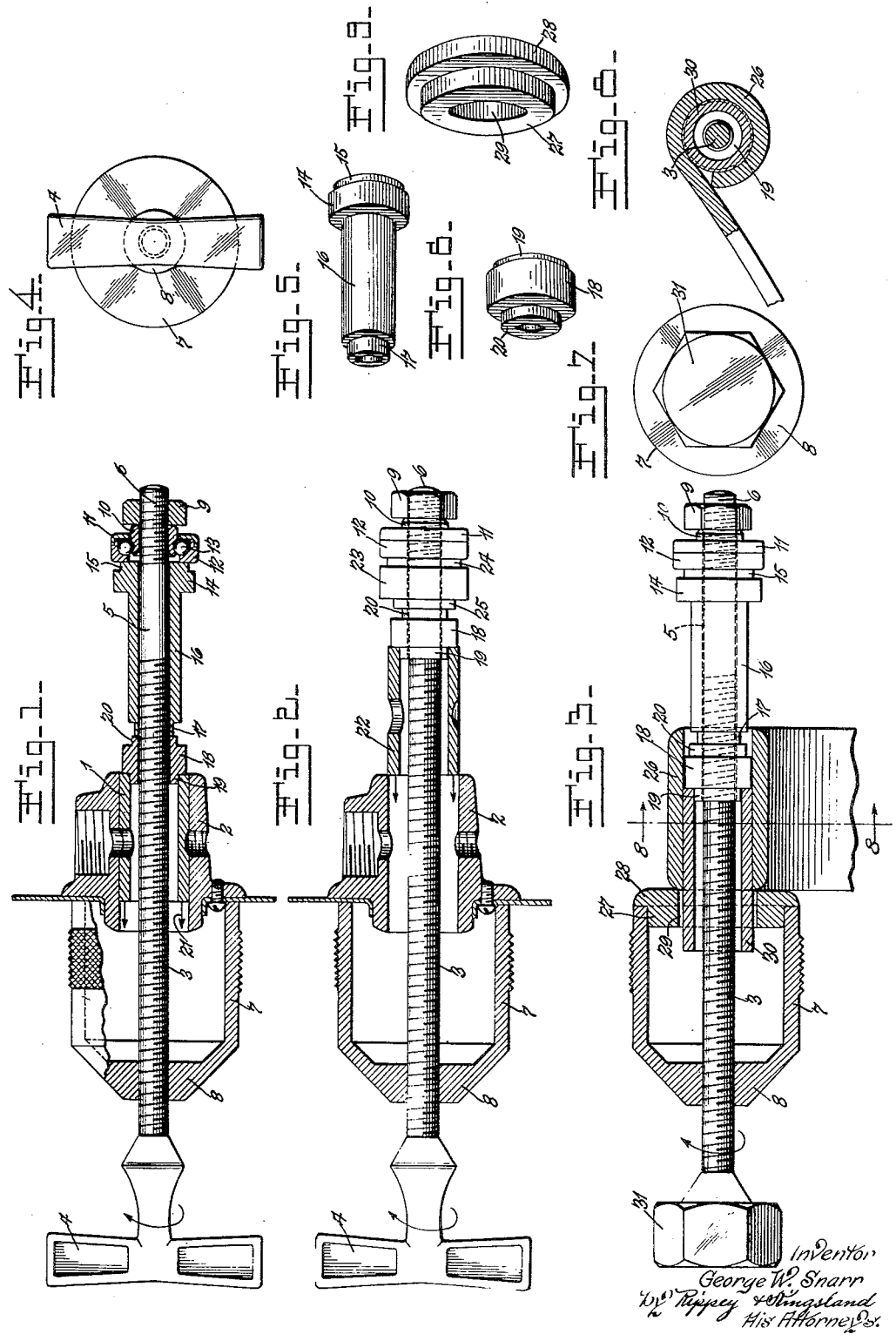
Inventor
George W. Snarr
By Pippey & Kingsland
His Attorneys Patented Feb. 14, 1933

1,897,737

UNITED STATES PATENT OFFICE

GEORGE W. SNARR, OF WEBSTER GROVES, MISSOURI, ASSIGNOR TO GEO. W. SNARR & CO., OF ST. LOUIS, MISSOURI, A CORPORATION OF MISSOURI

BEARING EXTRACTING AND INSTALLING DEVICE

Application filed May 25, 1932. Serial No. 613,409.

This invention relates to devices for extracting and installing bearing bushings or linings.

An object of this invention is to provide a device for use to extract or to insert a lining or bushing from a journal box or support and for lining the device, so that it will impart an axial pressure against and thereby force the bushing or lining into or from the journal box or support therefor.

Another object of the invention is to provide a device for use in extracting or installing bearing bushings or linings comprising a rotary shaft, a support therefor and abutments mounted on the shaft, all of said parts being of novel construction and arranged in a novel cooperative relationship, so that they will act against the bearing bushing or lining in an effective manner to extract or insert the same in a journal box or support without distorting or injuring any of the parts included in or acted upon by the invention.

Other objects and advantages will appear from the following description, reference being made to the accompanying drawing, in which—

Fig. 1 is a longitudinal sectional view of one embodiment of the invention assembled in connection with a bearing bushing or lining preparatory to operation to extract the bushing or lining from the journal box or support in which it is mounted.

Fig. 2 is a similar sectional view showing a form of the device mounted in connection with a bearing bushing or lining preparatory to operation to install the same in a journal box or support.

Fig. 3 is a sectional view showing the invention equipped with a part thereof comprising a removable abutment designed and adapted to engage the end of a relatively small support or journal box in which the bushing is mounted or is to be mounted.

Fig. 4 is an end elevation of the device.

Fig. 5 is a perspective view of a sleeve constituting a feature of the invention.

Fig. 6 is a perspective view of a collar forming a part of the invention.

Fig. 7 is an end elevation of the invention shown in Fig. 3.

Fig. 8 is a sectional view on the line 8—8 of Fig. 3.

Fig. 9 is a perspective view of the abutment forming a part of the invention and used to engage a comparatively small support or journal box to enable the invention to operate.

Referring specifically to Fig. 1 of the drawing, the bearing bushing or lining 1 is mounted in a journal box or support 2.

The device for removing the bushing or lining 1 from the support 2 comprises a shaft including a threaded portion 3 having a handle 4 in rigid or integral connection with one end thereof; an unthreaded portion 5 in axial continuation of the opposite end of the threaded portion 3; and a threaded terminal portion 6 in axial continuation of the outer end of the part 5. The threads on the parts 3 and 6 are of different pitch and formation.

A support comprising a tubular body 7 having a thickened end wall 8 in integral connection with one end thereof is mounted on the shaft. The end wall 8 has a threaded hole therethrough through which the threaded part 3 of the shaft is screwed, the end wall 8 being toward the handle 4 and the opening of the cylindrical part 7 being in the opposite direction. The unthreaded part 5 of the shaft constitutes means for preventing the member 7—8 from being screwed off the shaft. The parts may be assembled by first screwing the part 7—8 on the threaded part 3 of the shaft and then attaching the handle 4 to the end of the threaded part 3.

The nut 9 is screwed on the threaded terminal portion 6 and functions as an abutment for the projecting member 10 of an anti-friction thrust bearing. The ring of the anti-friction thrust bearing comprises two rigidly united members 11 and 12 and surrounding an annular series of balls 13 mounted around the member 11 which has a circumferential race of known construction to prevent the balls from moving longitudinally along said member 10 and to prevent said member 10 from being detached from the remaining bearing structure. The ring 11 is a thrust member for other parts of the invention.

The invention comprises a member composed of a cylindrical body 14 having a cylindrical coaxial extension 15 at one end and a cylindrical coaxial extension 16 at the opposite end with a cylindrical coaxial extension 17 at the end of the extension 16. These various parts 14, 15, 16 and 17 are of different diameters, the cylindrical extension 17 being of the smallest diameter, the cylindrical extension 16 of smaller diameter than the extension 15, and the cylindrical body 15 of maximum diameter.

The invention comprises a ring 18 having on one end a cylindrical extension 19 of less diameter than the diameter of the ring 18 and having on the opposite end a cylindrical extension 20 of less diameter than the extension 19.

The parts 15, 16, 17, 19 and 20 are designed and adapted to extend into bearing bushings or linings 1 of corresponding size. Thus, when the cylindrical extension 15 extends into a bearing bushing or lining of corresponding size, the adjacent end of the body 14 abuts against the end of the bearing bushing or lining. When the cylindrical extension 16 is extended into a bearing bushing or lining, the adjacent end of the cylindrical body 14 abuts against the end of the bushing or lining. When the cylindrical extension 17 is extended into a bearing bushing or lining of corresponding size, the adjacent end of the cylindrical extension 16 abuts against the end of the bearing bushing or lining. Similarly, when either of the cylindrical extensions 19 or 20 is extended into a bearing bushing or lining of corresponding size, the adjacent end of the ring 18 abuts against the ends of said bearing bushing or lining.

As shown in Fig. 1 of the drawing, the member 18 is mounted on the threaded shaft and has the cylindrical extension 19 extending into a bushing 1 of corresponding size while the adjacent end wall of the member 18 abuts against the end of the bushing 1. The device shown in Fig. 5 is mounted on the shaft having the end portion 15 bearing against the ring 12 of an anti-friction thrust bearing and having the end of the extension 17 engaging the end of the extension 20. The open end of the member 7 is engaged against the rigid support 2, so that rotation of the shaft will screw the shaft through the member 7, thereby forcing the bushing from the support 2. It will be understood that the ring 18 is of less diameter than the opening in which the bushing is mounted, so that said ring 18 will follow the bushing through the support. Similarly, the parts 16 and 17 are of less diameter than the opening in which the bushing is mounted, so that these parts may move through the opening in which the bushing is mounted. The bushing is thereby forced out of the support 2 and into the tubular member 7 in the direction of the arrows 21.

In Fig. 2 of the drawing, the device is shown mounted preparatory for use in forcing a bushing 22 into the support 2. In this use of the device, the member shown in Fig. 5 of the drawing is omitted and a comparatively short member is substituted therefor as a thrust member against the anti-friction bearing. This substituted member consists of a ring 23 having a reduced extension 24 on one end abutting against the anti-friction thrust bearing and a reduced extension 25 on the opposite end abutting against the extension 20. In this use of the device, the bushing 22 is placed coaxial with the opening into which it is to be placed and the shaft is held coaxial with the bushing by the extension 19 extending into the outer end of the bushing, while the open end of the tubular member 7 is properly located against the rigid support 2. When the parts are assembled in this relationship, the handle 4 is manipulated to screw the shaft 3 through the threaded hole in the part 8, thereby forcing the bushing 22 into the opening in the support 8.

In Figs. 1 and 2, the rigid support 2 is of sufficient size to provide an abutment for the end of the tubular part 7.

In Fig. 3, the support 26 is comparatively small and is of insufficient size to afford an abutment for the end of the tubular part 7. An abutment member, comprising a tubular body 27 designed and adapted to extend into the open end of the tubular body 7 and provided with a circumferential flange 28 on one end, is provided to cooperate with the part 7. In this use of the device, the longitudinal body 7 is extended into the tubular member 8 and the flange 28 is engaged against the end of the part 7 and is placed against the bearing 26. An opening 29 through the cylindrical body 27 is placed in alinement with the opening in the bearing 26, so that the bushing 30, similar to the bushings 1 and 22, may be forced from the bearing 26 by proper operation of the device in the manner made clearly apparent from the foregoing description.

Instead of using a manually operative handle 4, a polygonal head 31 may be provided on the end of the threaded portion 3 of the shaft and designed and adapted for engagement by a wrench.

It is now apparent that my invention is designed and adapted for many uses and may be used with equal convenience and satisfaction in extracting or installing bushings of various sizes. Indeed, the same elements may be employed to extract or install bushings of different sizes. The thrust members that engage the ends of the bushings are provided with extended portions designed and adapted to extend into the bushings and thus locate the shaft coaxially with the bushing and thereby avoid lateral strains and stresses and prevent the distortion of the bushings. Pressure is thereby applied to the ends of the bushings in a direction parallel with the axes thereof, so that no twisting or strains occur. The anti-friction thrust bearing against the nut 9 provides means for preventing the application of the exertion of twisting strains against the nut and the nut, being screwed on threads of different pitch from the pitch of the threads 3, it is impossible for the nut to screw on or from the shaft when the shaft is rotated and screwed in the threaded hole in the part 8.

The construction and arrangement of the device may be varied otherwise than as specifically shown in the drawing without departure from the nature and principle of the invention. I do not restrict myself in unessential particulars, but what I claim and desire to secure by Letters Patent is:

1. In a device of the character described, a shaft comprising two longitudinally spaced threaded portions, a hollow abutment member screwed on one of said threaded portions, a nut screwed on the other threaded portion, a formation of said shaft between said threaded portions preventing said abutment and said nut from being screwed beyond their respective threaded portions, an anti-friction thrust bearing mounted on said shaft and abutting said nut, a thrust member mounted on said shaft and abutting said bearing, and a cylindrical extension in connection with the end of said thrust member opposite said nut of less diameter than said thrust member and adapted to extend into a bushing while the adjacent portion of said thrust member abuts against said bushing.

2. A device of the character described comprising a shaft having two longitudinally spaced threaded portions and construction between said threaded portions preventing members screwed on said threaded portions from passing beyond said threaded portions, a hollow abutment member screwed on one of said threaded portions, a nut screwed on the other threaded portion, a thrust member mounted on said shaft, a cylindrical extension in connection with the end of said thrust member opposite said nut of less diameter than said thrust member and adapted to extend in a bushing while the adjacent portion of said thrust member abuts against the end of said bushing, and a rotary device mounted on said shaft between and engaging said thrust member and said nut and preventing said nut from turning said thrust member.

3. A device of the character described comprising a threaded shaft, a hollow abutment member screwed on said shaft and adapted to receive a bushing ejected from a journal box, a nut screwed on said shaft, a thrust member mounted on said shaft between said abutment member and said nut and adapted to extend into and abut against the end of the bearing bushing through which said shaft extends, and means mounted between and engaging said thrust member and said nut preventing said nut from turning said thrust member when said shaft is rotated.

4. A device of the character described comprising a threaded shaft, means for rotating said shaft, an abutment member screwed on said shaft and adapted to abut against a support in which a bushing is mounted, a nut screwed on said shaft, a cylindrical thrust member mounted on said shaft and adapted to extend into a bushing and support said shaft axially in the bushing and having a portion adapted to abut against the end of the bushing, and a rotary device mounted on said shaft between said thrust member and said nut permitting said shaft to rotate while said thrust member remains unrotated.

5. A device of the character described comprising a threaded shaft, an abutment member screwed on said shaft, a nut screwed on said shaft at a distance from said abutment member, an anti-friction thrust bearing mounted on said shaft against said nut, a thrust member mounted on said shaft and abutting said thrust bearing and adapted to remain unrotated when said shaft is rotated, and cylindrical extensions of different diameter in connection with said thrust member adapted to extend into bushings of different diameter and to support said shaft axially in said bushings.

6. A device of the character described comprising a threaded shaft, means for rotating said shaft, an abutment member screwed on said shaft, a nut screwed on said shaft at a distance from said abutment member, a thrust bearing mounted on said shaft for relative rotation thereto against said nut, a thrust member mounted on said shaft against said thrust bearing, and parts in connection with said thrust member adapted to extend into bushings of different diameter and to abut against the ends of said bushings and support said shaft axially in said bushings.

7. A device of the character described comprising a threaded shaft, an abutment member screwed on said shaft, a nut screwed on said shaft at a distance from said abutment member, means for preventing said abutment member and said nut from being screwed beyond predetermined positions along said shaft, and a thrust member mounted on said shaft in cooperative relation to said nut and having portions adapted to extend into and abut against the ends of bushings of different diameters and support said shaft axially in said bushings and to eject said bushings from their supports when said shaft is rotated.

8. A device of the character described comprising a threaded shaft, an abutment member screwed on said shaft, a nut screwed on said shaft at a distance from said abutment member, means for preventing said abutment member and said nut from being screwed beyond predetermined positions along said shaft, a thrust member mounted on said shaft in cooperative relation to said nut and having portions adapted to extend into and abut against the ends of bushings of different diameters and support said shaft axially in said bushings and to eject said bushings from their supports when said shaft is rotated, and a device mounted on said shaft between said nut and said thrust member preventing said nut from rotating said thrust member when said shaft is rotated.

9. A device of the character described comprising a shaft, an abutment member screwed on said shaft, a nut screwed on said shaft at a distance from said abutment member, a thrust member mounted on said shaft, portions in connection with said thrust member adapted to extend into and abut against the ends of bushings of different diameters and support said shaft axially in said bushings, and a device mounted on said shaft between said thrust member and said nut permitting said thrust member to remain unrotated when said shaft and said nut are rotated.

GEORGE W. SNARR.